(12) United States Patent
Steinberger et al.

(10) Patent No.: US 9,777,795 B2
(45) Date of Patent: Oct. 3, 2017

(54) TRANSMISSION DAMPER

(71) Applicant: Schaeffler Technologies AG & Co. KG, Herzogenaurach (DE)

(72) Inventors: Markus Steinberger, Macedonia, OH (US); Eric Zaugg, Strasburg, OH (US); Allen Pervo, Rocky River, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 163 days.

(21) Appl. No.: 14/692,784

(22) Filed: Apr. 22, 2015

(65) Prior Publication Data

US 2015/0316139 A1    Nov. 5, 2015

Related U.S. Application Data

(60) Provisional application No. 61/987,814, filed on May 2, 2014.

(51) Int. Cl.

| | |
|---|---|
| *F16H 57/00* | (2012.01) |
| *F16H 55/56* | (2006.01) |
| *F16F 15/134* | (2006.01) |
| *F16F 15/123* | (2006.01) |

(52) U.S. Cl.
CPC .......... *F16F 15/134* (2013.01); *F16F 15/123* (2013.01); *F16H 55/56* (2013.01); *F16H 57/00* (2013.01); *F16H 57/0006* (2013.01); *F16F 2226/048* (2013.01)

(58) Field of Classification Search
CPC ... F16F 15/134; F16F 15/13164; F16H 55/56; F16H 57/0006; F16H 57/00
USPC .......................................................... 464/180
See application file for complete search history.

(56) References Cited

U.S. PATENT DOCUMENTS

| | | | |
|---|---|---|---|
| 4,458,318 A | 7/1984 | Smit et al. | |
| 6,322,466 B1* | 11/2001 | Eidloth | F16C 27/066 474/18 |
| 2004/0206201 A1* | 10/2004 | Tsuruta | F16F 15/13164 464/180 |
| 2008/0096703 A1 | 4/2008 | Labbe | |
| 2013/0345004 A1* | 12/2013 | McCrary | F16D 15/00 474/148 |

* cited by examiner

*Primary Examiner* — William E Dondero
*Assistant Examiner* — Robert T Reese
(74) *Attorney, Agent, or Firm* — Kevin L. Parks (57) ABSTRACT

A transmission damper includes a first cover plate, a flange, a spring, and a shaft. The first cover plate includes a first spring window and is arranged for fixing to a sheave for a continuously variable transmission. The flange is rotatable relative to the first cover plate and includes a second spring window. The spring is disposed in the first and second spring windows. The shaft is fixed to an inner portion of the flange and arranged for connecting to an engine crankshaft. In an example embodiment, the shaft is fixed to the flange by welding. In an example embodiment, the sheave is rotatable relative to the shaft. In an example embodiment, the shaft includes an internal taper for connecting to the engine crankshaft. In an example embodiment, the flange includes a radially extending tab arranged for contacting a portion of the cover plate after a predetermined rotation.

16 Claims, 7 Drawing Sheets

TRANSMISSION DAMPER

FIELD

The invention relates generally to a damper, and more specifically to a transmission damper for a continuously variable transmission.

BACKGROUND

Dampers for continuously variable transmission (CVTs) are known. Examples are shown in United States Patent Application Publication No. 2008/0096703 and U.S. Pat. No. 4,458,318.

BRIEF SUMMARY

Example embodiments broadly comprise a transmission damper including a first cover plate, a flange, a spring, and a shaft. The first cover plate includes a first spring window and is arranged for fixing to a sheave for a continuously variable transmission. The flange is rotatable relative to the first cover plate and includes a second spring window. The spring is disposed in the first and second spring windows. The shaft is fixed to an inner portion of the flange and arranged for connecting to an engine crankshaft. In an example embodiment, the shaft is fixed to the flange by welding. In an example embodiment, the sheave is rotatable relative to the shaft. In an example embodiment, the shaft includes an internal taper for connecting to the engine crankshaft. In an example embodiment, the flange includes a radially extending tab arranged for contacting a portion of the cover plate after a predetermined rotation.

In some example embodiments, the transmission damper includes the sheave and a bolt. The first cover plate includes a first hole and the sheave includes a second, tapped hole. The bolt is installed in the first hole and threaded into the tapped hole to fix the first cover plate to the sheave. In some example embodiments, the transmission damper includes a second cover plate fixed to the first cover plate and includes a third spring window. The spring is disposed in the third spring window and the flange is disposed axially between the first and second cover plates. In some example embodiments, the first and second cover plates are fixed together by rivets. In an example embodiment, the bolt is radially inside of the rivets.

In an example embodiment, the flange includes a radially extending tab arranged for contacting the bolt after a predetermined rotation. In some example embodiments, the transmission damper includes a spacer tube installed on the bolt and disposed axially between the cover plate and the sheave The flange includes a radially extending tab arranged for contacting the spacer tube after a predetermined rotation. In an example embodiment, the transmission damper includes a shim installed on the bolt axially between the spacer tube and the sheave.

Other example aspects broadly comprise a transmission damper including a first sheave for a continuously variable transmission, a first plate directly connected to the first sheave, a second plate connectable to an engine crankshaft, and a spring for opposing rotation of the first plate relative to the second plate. In some example embodiments, the transmission damper includes a tapered shaft arranged for bolting to the engine crankshaft. The first plate is bolted to the first sheave and the second plate is welded to the tapered shaft. In an example embodiment, the first sheave is rotatable relative to the shaft. In an example embodiment, the transmission damper includes a belt and a second sheave. The first and second sheaves cooperate to clamp the belt to transmit torque.

BRIEF DESCRIPTION OF THE DRAWINGS

The nature and mode of operation of the present invention will now be more fully described in the following detailed description taken with the accompanying drawing figures, in which.

DETAILED DESCRIPTION

At the outset, it should be appreciated that like drawing numbers appearing in different drawing views identify identical, or functionally similar, structural elements. Furthermore, it is understood that this invention is not limited only to the particular embodiments, methodology, materials and modifications described herein, and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the following example methods, devices, and materials are now described.

Figure 1:
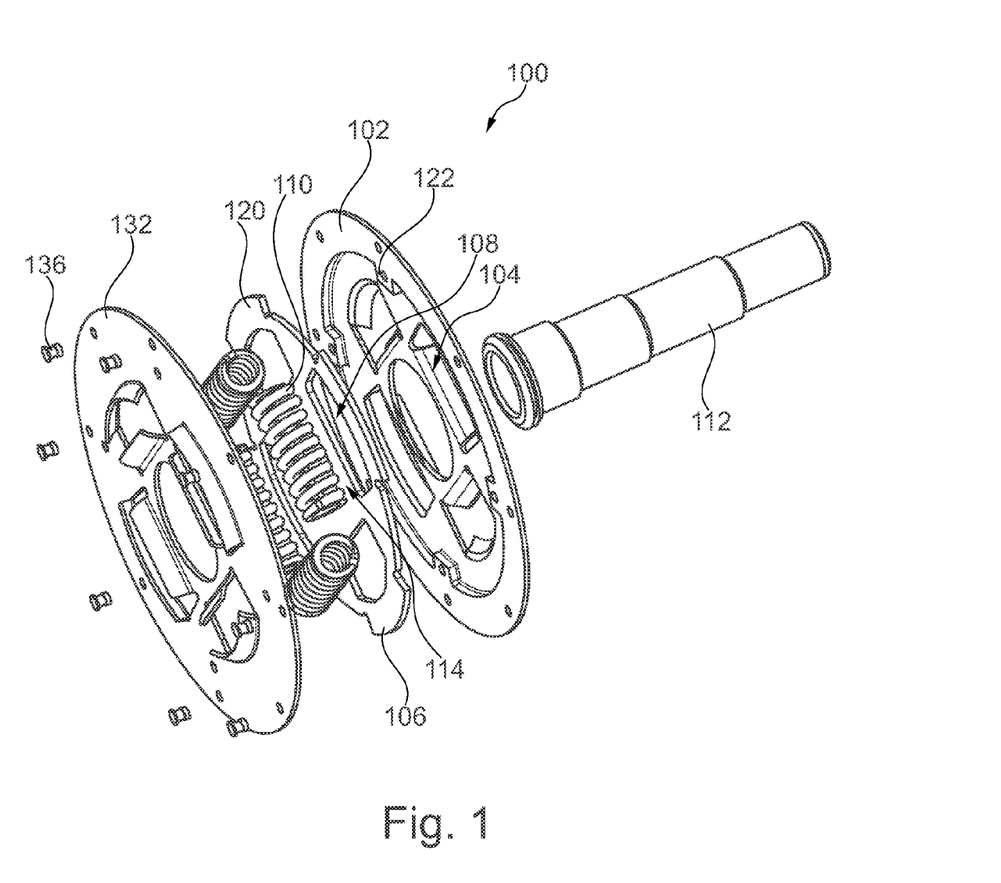
FIG. 1 is a perspective view of a transmission damper according to an example aspect.
Figure 2:
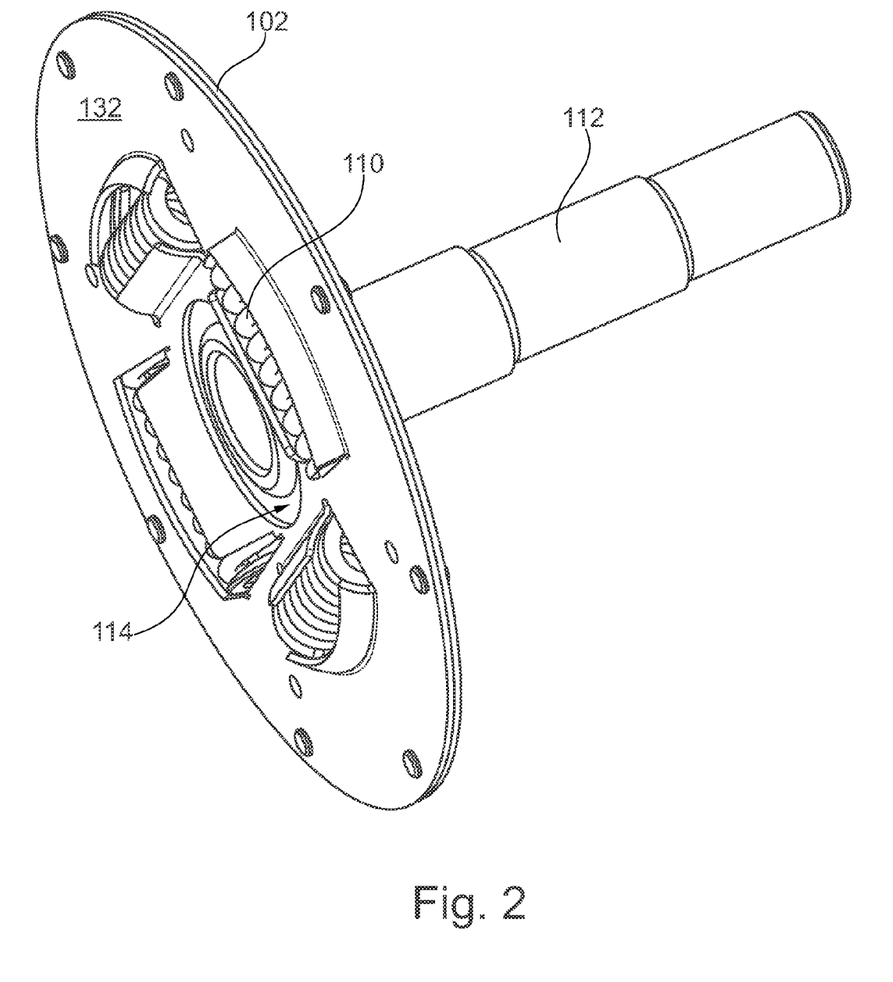
FIG. 2 is a perspective view of the transmission damper of FIG. 1.
Figure 3:
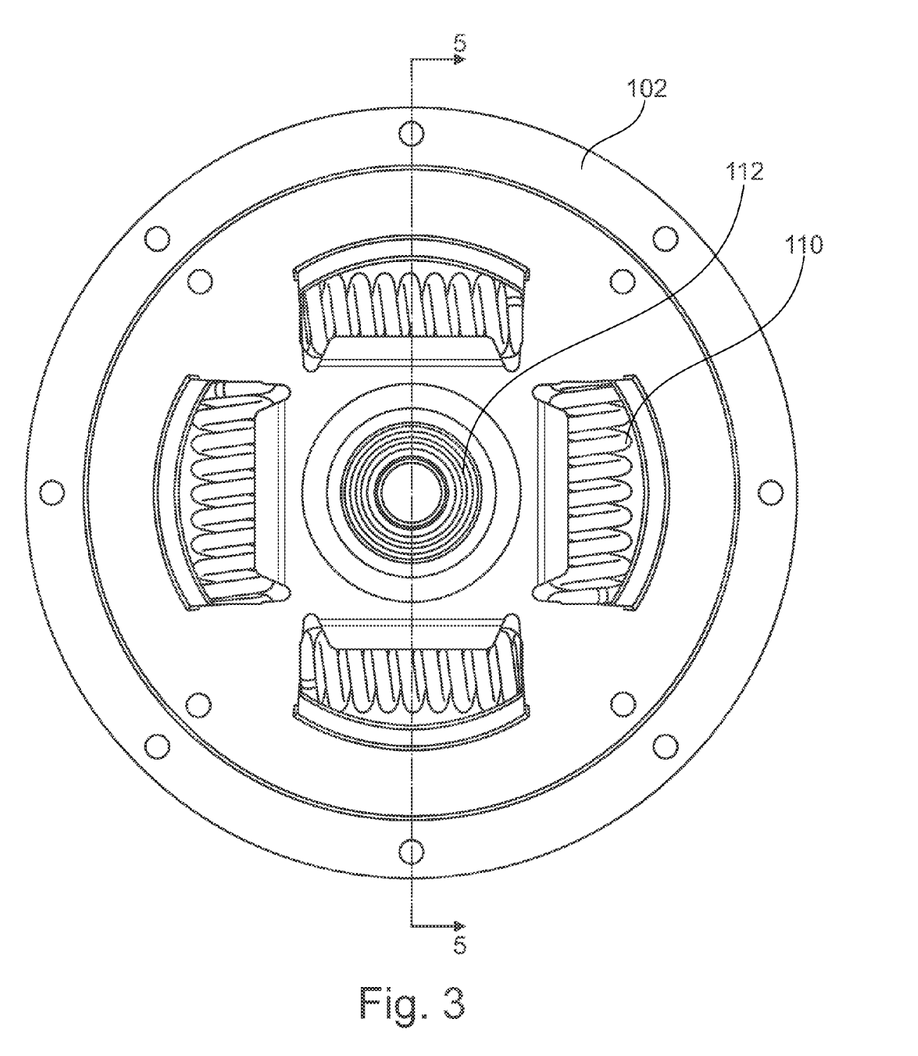
FIG. 3 is a front view of the transmission damper of FIG. 1.
Figure 4:
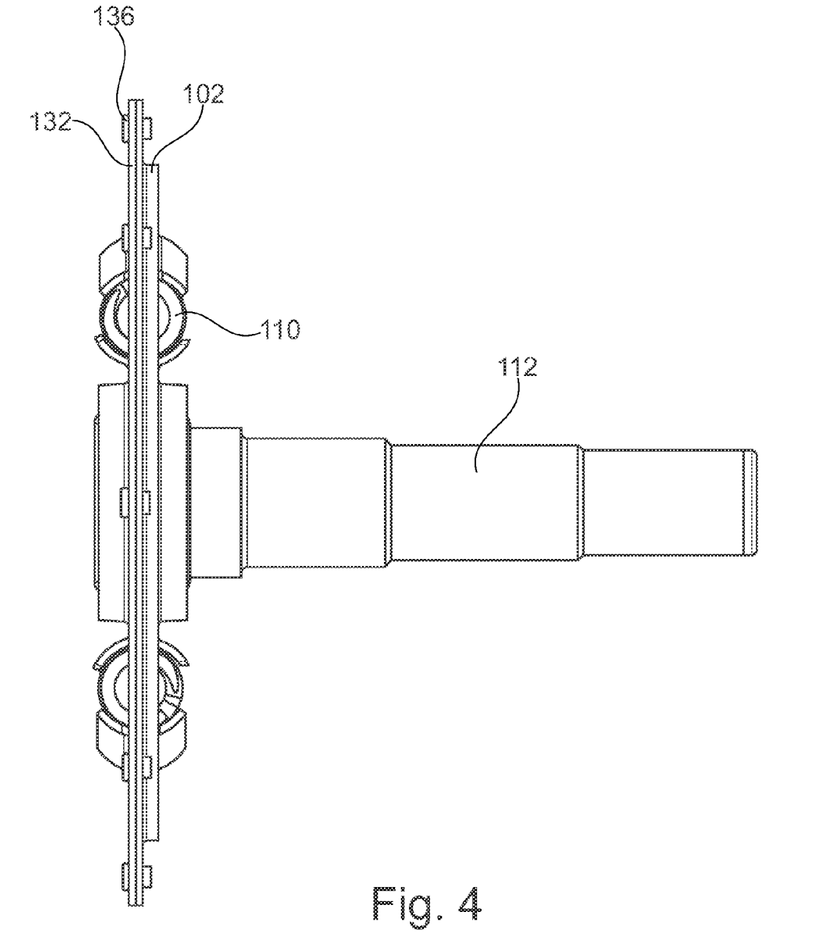
FIG. 4 is a side view of the transmission damper of FIG. 1.
Figure 5:
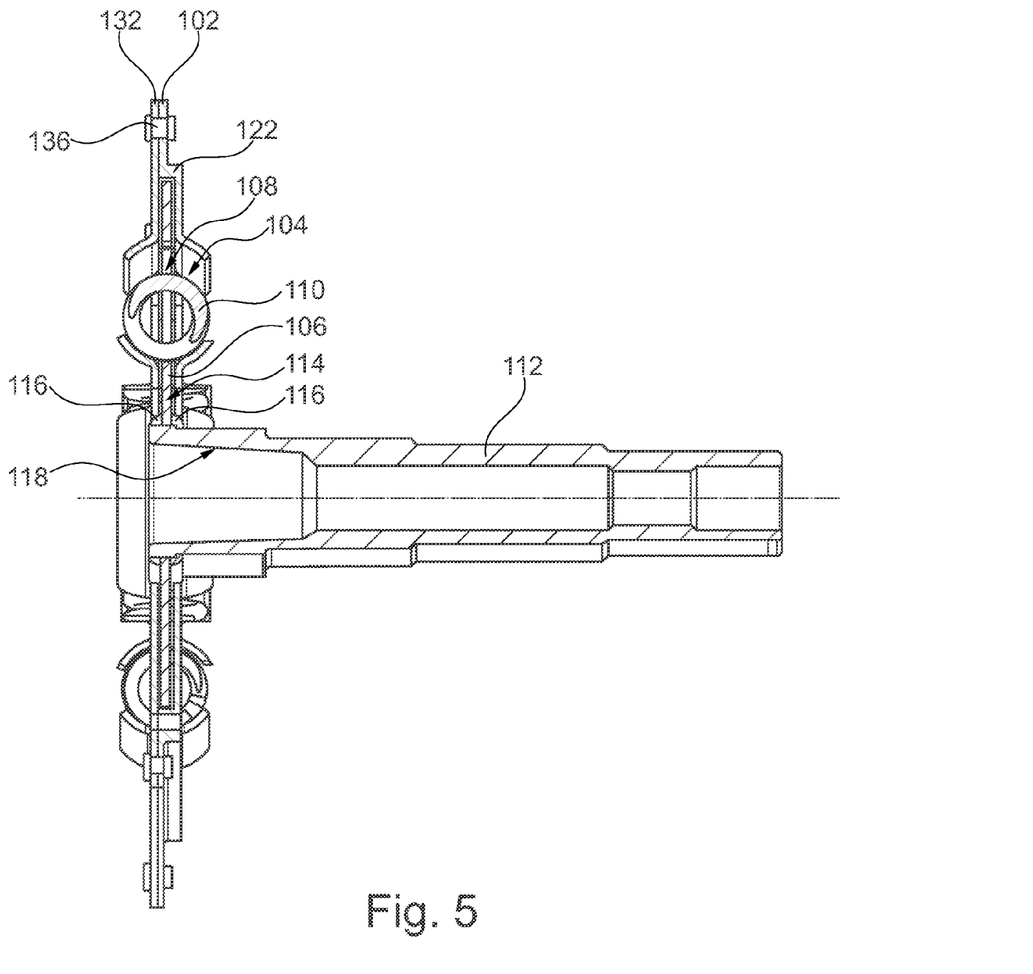
FIG. 5 is a cross-section view of the transmission damper of FIG. 1 taken generally along line 5-5 in FIG. 3.

The following description is made with reference to FIGS. 1-5. FIG. 1 is a perspective view of a transmission damper according to an example aspect. FIG. 2 is a perspective view of the transmission damper of FIG. 1. FIG. 3 is a front view of the transmission damper of FIG. 1. FIG. 4 is a side view of the transmission damper of FIG. 1. FIG. 5 is a cross-section view of the transmission damper of FIG. 1 taken generally along line 5-5 in FIG. 3. Transmission damper 100 includes cover plate, or plate, 102 with spring window 104. Cover plate 102 is arranged for fixing to a sheave for a continuously variable transmission (not shown) as described below. Transmission damper 100 includes flange, or plate, 106. Plate 106 is connectable to an engine crankshaft (not shown) as described below. Flange 106 is rotatable relative to the cover plate 102. Flange 106 includes spring window 108. Transmission damper 100 includes spring 110 disposed in spring windows 104 and 108. Spring 110 is for opposing rotation of the plate 102 relative to second plate 106. Transmission damper 100 includes shaft 112 fixed to inner portion 114 of flange 106. Shaft 112 is arranged for connecting to an engine crankshaft (not shown) as described below.

Shaft 112 is fixed flange 106 by weld 116. Although weld 116 is shown on both sides of flange 106, other embodiments (not shown) may have weld 116 on only one side of flange 106. The sheave (not shown) is rotatable relative shaft 112. Shaft 112 includes internal taper 118 for connecting to the engine crankshaft (not shown). Flange 106 includes radially extending tab 120 arranged for contacting portion 122 of cover plate 102 after a predetermined rotation. That is, the flange tab contact the cover plate to prevent further rotation of the flange relative to the cover plate. Because the shaft is connected to the flange and the sheave is connected to the cover plate, the tab also limits rotation of the shaft relative to the sheave.

Figure 6:
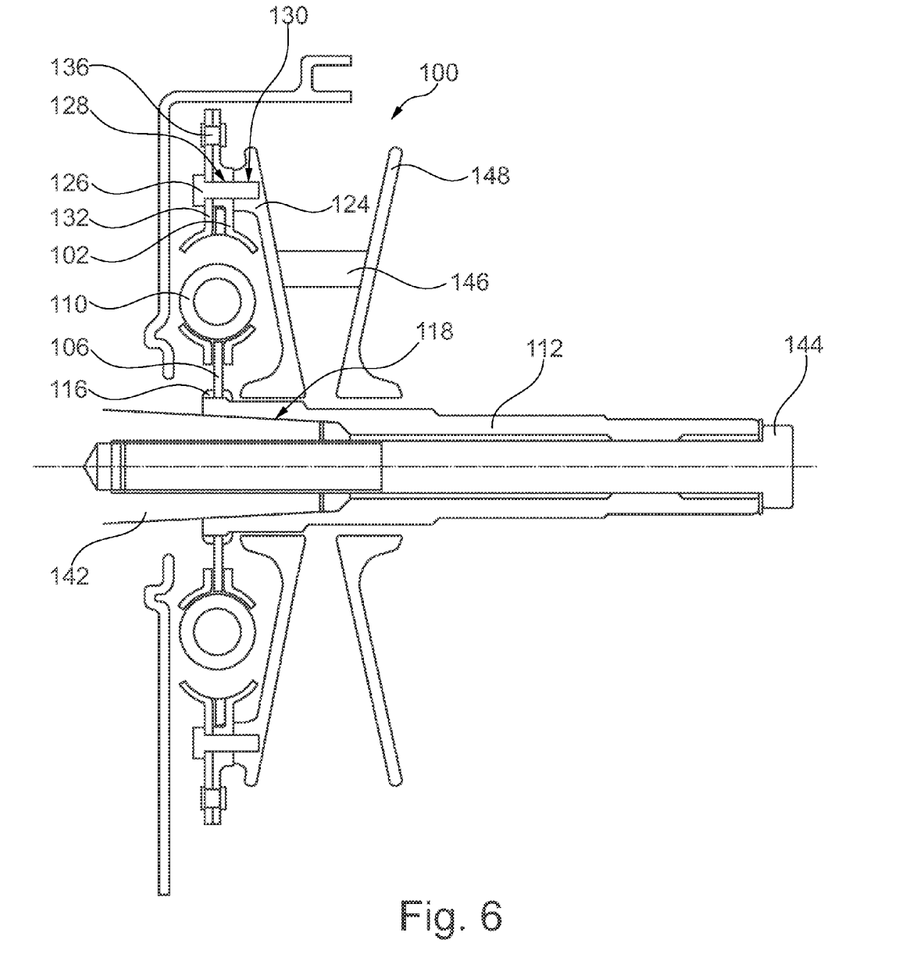
FIG. 6 is a cross-section view of the transmission damper of FIG. 1 shown installed with a continuously variable transmission sheave and an engine crankshaft; and, FIG. 7 is a cross section view of an alternative embodiment of a transmission damper according to an example aspect.

The following description is made with reference to FIG. 6. FIG. 6 is a cross-section view of the transmission damper of FIG. 1 shown installed with a continuously variable transmission sheave and an engine crankshaft. Transmission damper 100 includes sheave 124 and bolt 126. Cover plate 102 includes hole 128 and sheave 124 includes tapped hole 130. Bolt 126 is installed in hole 128 and threaded into tapped hole 130 to fix cover plate 102 to sheave 124. That is, plate 102 is directly connected to sheave 124. Transmission damper 100 includes cover plate 132 fixed to cover plate 102. Cover plate 132 includes spring window 134. Spring 110 is disposed in spring window 134. Flange 106 is disposed axially between cover plates 102 and 132. Cover plates 102 and 132 are fixed together by rivets 136. Bolt 126 is radially inside of rivets 136. Tapered shaft 110 is arranged for bolting to engine crankshaft 142 via bolt 144, for example. That is, crankshaft 142 has an external taper that mates with internal taper 118 of shaft 110 and bolt 144 threads into a threaded hole in the crankshaft to frictionally engage the two tapers.

Transmission damper 100 includes belt 146 and sheave 148. Although damper 100 is shown with a belt, other embodiments may include a CVT chain instead of belt 146. Sheaves 124 and 148 cooperate to clamp belt 146 to transmit torque as is known in the art. In an example embodiment, a spring and/or centrifugal weights (not shown) may be used to force the sheaves together to clamp the belt. That is, each sheave has a conical surface and the belt has a trapezoidal cross section with sides that match the angle of the cones. The belt may be forced radially inward or outward on the sheaves to change a ratio depending on the force applied to the sheaves and the belt.

Figure 7:
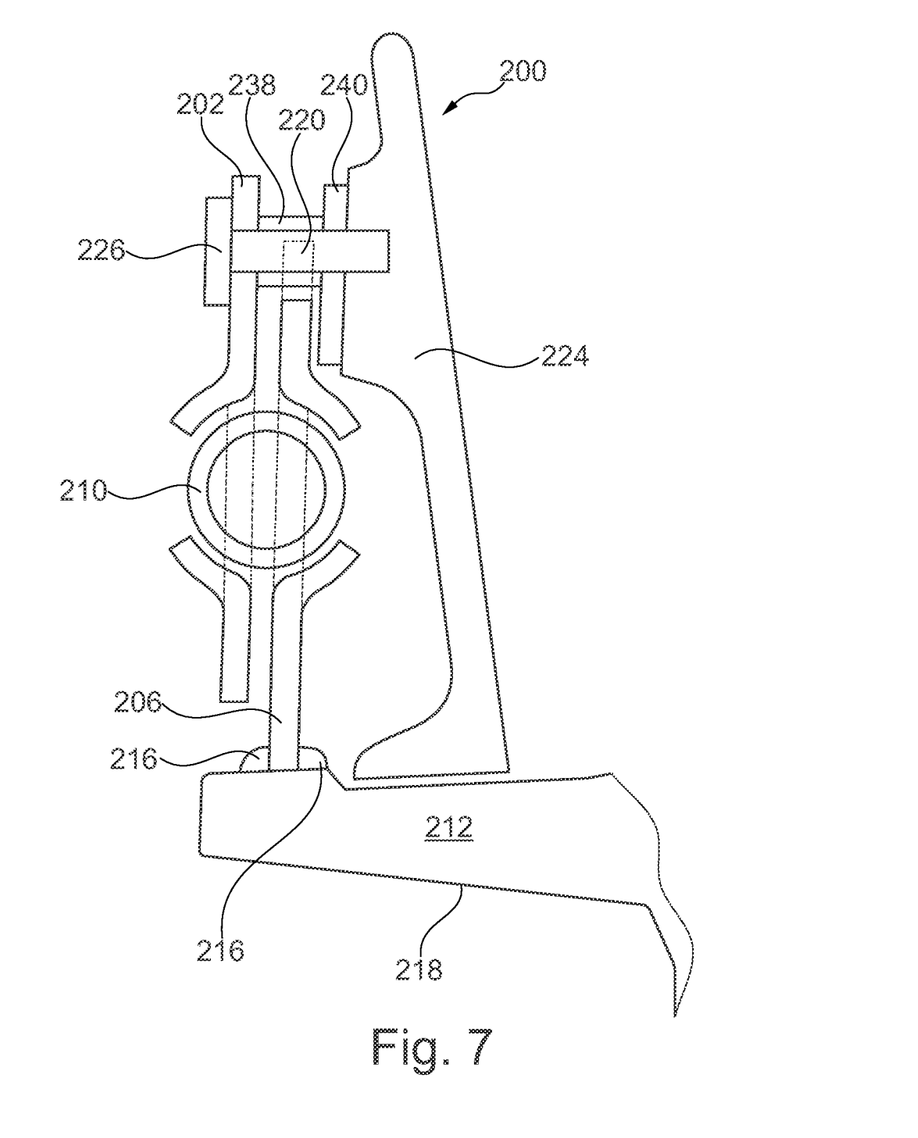

The following description is made with reference to FIG. 7. FIG. 7 is a cross section view of an alternative embodiment of a transmission damper according to an example aspect. Transmission damper 200 is functionally similar to transmission damper 100 and 2XX number correspond to 1XX numbers except as described below. Transmission damper 200 includes cover plate 202, flange 206, sheave 224, and bolt 226. Transmission damper 200 is a 'scissor' damper and does not include a second cover plate as in transmission damper 100. Flange 206 includes radially extending tab 220 arranged for contacting bolt 226 after a predetermined rotation. Damper 200 includes spacer tube 238 installed on bolt 226 and disposed axially between cover plate 202 and sheave 224. Flange 206 includes radially extending tab 220 arranged for contacting spacer tube 238 after a predetermined rotation. Transmission damper 200 also includes shim 240 installed on bolt 226 axially between spacer tube 238 and sheave 234.

Of course, changes and modifications to the above examples of the invention should be readily apparent to those having ordinary skill in the art, without departing from the spirit or scope of the invention as claimed. Although the invention is described by reference to specific preferred and/or example embodiments, it is clear that variations can be made without departing from the scope or spirit of the invention as claimed.

What we claim is:

1. A transmission damper comprising:
    a sheave for a continuously variable transmission;
    a first cover plate including a first spring window fixed to the sheave;
    a flange, rotatable relative to the first cover plate, including a second spring window;
    a first spring disposed in the first spring window and the second spring window; and,
    a shaft, fixed to an inner portion of the flange and arranged for connecting to an engine crankshaft.

2. The transmission damper of claim 1 wherein the shaft is directly fixed to the flange by welding.

3. The transmission damper of claim 1 wherein the shaft includes an internal taper for connecting to the engine crankshaft.

4. The transmission damper of claim 1 wherein the flange includes a radially extending tab arranged for contacting a portion of the cover plate after a predetermined rotation.

5. The transmission damper of claim 1 further comprising a second cover plate fixed to the first cover plate and including a third spring window, wherein the first spring is disposed in the third spring window and the flange is disposed axially between the first and second cover plates.

6. The transmission damper of claim 5 wherein the first and second cover plates are fixed together by rivets.

7. The transmission damper of claim 6 wherein the bolt is radially inside of the rivets.

8. The transmission damper of claim 1 wherein the flange includes a radially extending tab arranged for contacting the bolt after a predetermined rotation.

9. The transmission damper of claim 1 further comprising a spacer tube installed on the bolt and disposed axially between the cover plate and the sheave, wherein the flange includes a radially extending tab arranged for contacting the spacer tube after a predetermined rotation.

10. The transmission damper of claim 9 further comprising a shim installed on the bolt axially between the spacer tube and the sheave.

11. The transmission damper of claim 1 further comprising a bolt, wherein:
    the first cover plate includes a first hole;
    the sheave includes a second, tapped hole; and,
    the bolt is installed in the first hole and threaded into the tapped hole to fix the first cover plate to the sheave.

12. The transmission damper of claim 11 wherein:
    the first and second cover plates are fixed together by rivets;
    the bolt is radially inside of the rivets;
    the flange includes a radially extending tab; and
        the tab is arranged for contacting the first or second cover plate after a predetermined rotation; or
        the tab is arranged for contacting the bolt after a predetermined rotation, or
        the transmission damper comprises a spacer tube installed on the bolt and the tab is arranged for contacting the spacer tube after a predetermined rotation.

13. A transmission damper comprising:
  a first sheave for a continuously variable transmission;
  a first plate directly connected to the first sheave;
  a second plate connectable to an engine crankshaft; and
  a spring for opposing rotation of the first plate relative to the second plate.

14. The transmission damper of claim 13 further comprising a tapered shaft arranged for bolting to the engine crankshaft, wherein the first plate is bolted to the first sheave and the second plate is welded to the tapered shaft.

15. The transmission damper of claim 14 wherein the first sheave is rotatable relative to the shaft.

16. The transmission damper of claim 13 further comprising:
  a belt; and,
  a second sheave, wherein the first and second sheaves cooperate to clamp the belt to transmit torque.

\* \* \* \* \*